Sept. 4, 1923.
J. S. TREMAYNE
CHAIN JACK
Filed Aug. 16, 1921
1,466,977
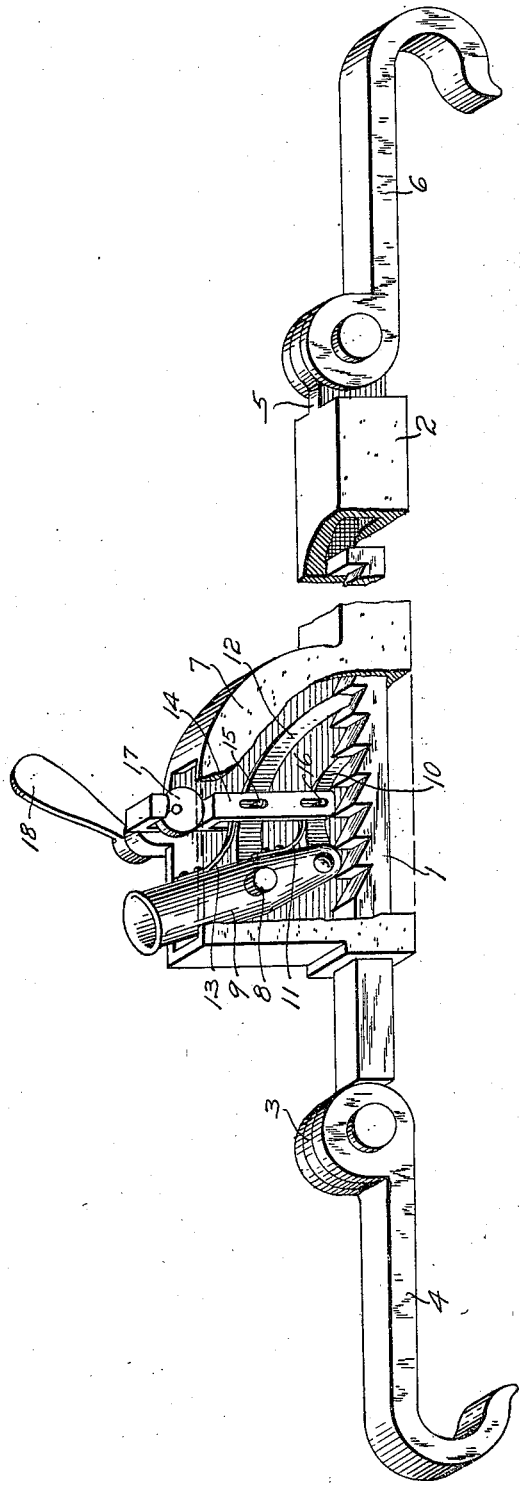
INVENTOR.
John S. Tremayne
BY Westall and Wallace
ATTORNEYS.

Patented Sept. 4, 1923.

1,466,977

UNITED STATES PATENT OFFICE.

JOHN S. TREMAYNE, OF LONG BEACH, CALIFORNIA.

CHAIN JACK.

Application filed August 16, 1921. Serial No. 492,647.

*To all whom it may concern:*

Be it known that I, JOHN S. TREMAYNE, a citizen of the United States, and resident of Long Beach, in the county of Los Angeles and State of California, have invented new and useful Improvements in a Chain Jack, of which the following is a specification.

This invention relates to a tool for drawing together links of a chain and holding the chain under tension. Chains used for driving wheels and the like are of the type especially referred to, and the embodiment of the invention disclosed herein is especially adapted for use with roller chains.

Roller chains are much used in oil well work, and the force required to place the chains under tension in their position upon the wheels of such machinery is comparatively great. Where slack is to be taken from a chain by removing links, where a chain requires the insertion of new links, or the joining of the ends, it has been found a difficult piece of work to tighten the chains while in position upon the wheels. This invention is designed to obviate the above mentioned difficulties. The primary object thereof is to provide a tool easy to attach to the parts of the chain to be drawn toward each other, easy to manipulate in placing tension on the chain, and not interfering with work upon the links. In addition to the broader objects of this invention, there are certain details of design, whereby a simple, strong, durable, and economical device is obtained.

An embodiment of the invention is disclosed in the accompanying drawing, in which: The figure is a perspective view of a tool having a portion broken out and partially shown in section, and a portion broken away to show the lever socket and pawls.

Referring more particularly to the drawing, 1 indicates a rack bar slidably disposed in a sleeve 2. This rack bar has teeth of the character used in toothed lifting bars commonly used with various types of lifting jacks. At the outer end of rack bar 1 is an eye 3 to which is pivotally secured a hook 4 adapted to engage the roller link of a chain. Formed on the end of sleeve 2 is an eye 5 similar to eye 3, and pivotally secured to the eye is a hook 6 similar to hook 4. The sleeve has formed thereon adjacent one end a housing 7. Mounted upon a pivot pin 8 is a hand lever socket 9. Pivotally secured to the lower end of lever socket 9 is a pawl 10 for engaging the teeth on the rack bar and moving the rack inwardly within the sleeve. I have shown a leaf spring 11 to hold the pawl in engagement with the teeth. Mounted upon the pivot pin 8 so that it has no advancing movement is a locking pawl 12. This pawl is held in engagement with the teeth by leaf spring 13. A yoke 14 has slots in which are mounted pins 15 and 16, the latter being fixed to the pawl. The top of the yoke is provided with a way in which operates an eccentric 17 pivoted on the housing 7 and connected to lever 18 whereby it may be turned. This means is only one of several which may be used to positively lift the pawls and permit the expansion of the jack.

Assume that the jack has been expanded and that rack bar 1 is in its outermost position with respect to the sleeve. Hooks 4 and 6 are engaged with links on the chain, a handle is placed in socket 9, and the latter rocked to advance the rack bar into the sleeve and contract the tool. The operation of the various elements of the device is obvious. The links are drawn toward each other until sufficient tension has been placed upon the chain. The work to be done upon the chain is completed, hand lever 18 rocked to release the pawls from the rack bar, and the tool removed.

What I claim is:

A chain jack comprising a sleeve, a rack bar slidably mounted within said sleeve, a hook pivotally mounted on said sleeve, a hook pivotally mounted on said rack bar, a pawl mechanism mounted on said sleeve for retracting said rack bar within said sleeve, lock means to hold said bar and said sleeve in expanded position, and means to place said lock means in inoperative position.

In witness that I claim the foregoing I have hereunto subscribed my name this 10th day of August, 1921.

JOHN S. TREMAYNE.